United States Patent [19]

Nikitenko

[11] Patent Number: 5,077,063

[45] Date of Patent: Dec. 31, 1991

[54] PROCESS FOR PREPARING LACTIC-ACID PRODUCTS

[76] Inventor: Vyacheslav I. Nikitenko, ulitsa Volodarskogo, 27, kv. 53, Orenburg, U.S.S.R.

[21] Appl. No.: 449,872

[22] PCT Filed: Nov. 4, 1988

[86] PCT No.: PCT/SU88/00222

§ 371 Date: Dec. 15, 1989

§ 102(e) Date: Dec. 15, 1989

[87] PCT Pub. No.: WO89/09546

PCT Pub. Date: Oct. 19, 1989

[30] Foreign Application Priority Data

Apr. 15, 1988 [SU] U.S.S.R. ............................... 4428223

[51] Int. Cl.$^5$ ............................................. A23C 9/12
[52] U.S. Cl. ........................................ 426/42; 426/43; 426/61; 426/580; 435/839

[58] Field of Search ....................... 426/34, 42, 43, 61, 426/580; 435/839

[56] References Cited

U.S. PATENT DOCUMENTS

| | | | |
|---|---|---|---|
| 3,480,443 | 11/1969 | Schuler | 99/59 |
| 4,416,905 | 11/1983 | Lundstedt et al. | 426/43 |
| 4,569,846 | 2/1986 | Ohzeki et al. | 426/43 |

*Primary Examiner*—Marianne Cintins
*Attorney, Agent, or Firm*—Burgess, Ryan & Wayne

[57] ABSTRACT

A process for preparing lactic-acid products which involves fermentation of milk or dairy products with live bacteria, viz. the strain *Bacillus subtilis* 534 deposited at the All-Union Collection of Microorganisms of the Institute of Biochemistry and Physiology of Microorganisms, the USSR Academy of Sciences and registered under No. B-1666D; the fermentation is conducted until the desired product is obtained.

2 Claims, No Drawings

PROCESS FOR PREPARING LACTIC-ACID PRODUCTS

BACKGROUND OF THE INVENTION

1. Field of the Invention

The present invention relates to the food industry and, more particularly, to a process for preparing lactic-acid products.

2. Description of the Related Art

Known and widely employed in the art are processes for preparing lactic-acid products, wherein into a pasteurized milk or buttermilk a leaven containing bacteria producing lactic acid is introduced. Curdling of the milk or component thereof is effected at a temperature of 28° to 38° C. for 10 to 24 hours. After inspection of quality of the resulting product (kefir, acidophilus milk) and certification of acceptance thereof, it is ready for sale. One is allowed to store the product at a temperature of 2°-8° C. for 24 hours. In the manufacture of the above-mentioned products use is made of lactic-acid streptococci, lactic-acid acidophilic and propionic-acid bacteria (SU, A, Nos. 1238746, 1287822, 1271479).

The lactic-acid products obtained by the above-mentioned processes have a very slight therapeutic and preventive effect in the case of dysbacterioses, bacterial infections of the gastro-intestinal tract and are absolutely ineffective in pyo-inflammatory processes, food allergy, or diatheses. Due to a high acidity, there products are counter-indicated in the case of peptic ulcer and gastritis with an increased secretion.

In the manufacture of lactic-acid products by the above discussed processes contamination of the final product with allegedly pathogenic microflora (staphylococci, salmonella, shigella and the like), which results in putrefaction of the products and, in some cases, in food poisoning, is possible. The known lactic-acid products such as kefir and acidophilus milk have a short storage life (below 24 hours).

SUMMARY OF THE INVENTION

The present invention is directed to the use of a novel species of bacteria, in a process which makes it possible to prepare lactic-acid products exhibiting therapeutic and preventive properties in the case of bacterial infections, disbacteriosis, diathesis, or food allergy.

This object is accomplished by a process for preparing lactic-acid products by fermentation of milk or products thereof with live bacteria with the formation of the desired product. According the present invention as the live bacteria use is made of a strain of bacteria *Bacillus subtilis* 534 deposited on Mar. 28, 1988, at the All-Union Collection of microorganisms of the Institute of Biochemistry and Physiology of Microorganisms, USSR Academy of Sciences, and registered under No. B-1666D.

It is advisable that the strain according to the present invention be used in the fermentation process in an amount of from $10^3$ to $10^{11}$ of live cells per $dm^3$ of milk or dairy products.

The process according to the present invention ensures preparation of a product possessing active therapeutic and preventive properties in cases of bacterial infections, disbacteriosis, diathesis, or food allergy. This is due to the fact that the novel strain actively produces, into the ambient medium, a wide-spectrum antibiotic of the protein nature, proteolytic enzymes, an immunomodulator. Furthermore, the bacteria can penetrate into the tissue of the pathological focus thus providing a therapeutic effect in the case of pyo-inflammatory processes beyond the gastro-intestinal tract. The prior art dairy products have not been used for this purpose as yet.

Owing to a high activity of the antibacterial substance produced by the novel strain, in the production and storage of lactic-acid products there is substantially avoided the risk of growth of pathogenic bacteria: spaphylococci, salmonella, dysentery bacillus, and streptococci in the dairy products. In the prior art processes the development of said pathogenic bacteria is encountered rather frequently which results in damage of the product and, in some cases, in poisonings and outbreak of infection. The dairy products obtained with the use of the novel strain can be stored, under similar conditions, for a period longer by 2-3 times as compared with the product prepared by the known processes.

The products obtained by the process according to the present invention have a new pleasent slightly sweet taste.

BEST MODE FOR CARRYING OUT THE INVENTION

The process according to the present invention is effected in the following manner.

Milk or its products (buttermilk, whey) is pasteurized at a temperature of from 75° to 100° C. for 15 to 30 minutes.

A leaven is prepared from a lyophilized 3-days' culture of the strain *Bacillus subtilis* 534 which is suspended in sterile milk. The leaven is introduced into the milk or its products at a temperature of 75°-100° C. at a rate of from $10^3$ to $10^{11}$ live cells per $dm^3$. The fermentation is conducted at a temperature of 30°-38° C. for a period of 6 to 24 hours. After the formation of a uniform dense curd the fermentation is completed to give an odourless product with a slightly sweet taste.

The resulting product has its Turner acidity within the range of from 20° to 50° T. Phosphase is absent, contamination with foreign microflora is not detected. The dry solids amount ranges from 10 to 14% by mass.

The novel strain *Bacillus subtilis* 534 employed in the process according to the present invention has been isolated from a human being and has the following morphological features and physiological properties.

It is bacilliform. The size of cells of a one-day agar culture is $(2-4) \times (0.6-0.8)$ $\mu$m. Bacteria are virulent. Form spores, do not form capsules. Gram-positive. Colonies on a meat-peptone agar are rough, with scalloped edges, slightly pink shade, of 2-12 mm diameter. The strain is multiplied at a temperature of 15°-50° C., optimal growth temperature—36°-37° C. Cleaves glucose, saccharose, mannitol to an acid without evolution of a gas. Does not ferment lactose. Does not form hydrogen sulphide of indole. Evolves acetylmethylcarbinol and catalase. Sensitive to benzylpenicillin, ampicillin, erythromycin, monomycin, linkomycin, tetracycline, insensitive to polymixin.

The strain produces an antibiotic with a wide spectrum of action which inhibits growth of staphylococci, streptococci, proteum, blue pus bacillus, salmonella, shigella, yeas fungi and the like. Furthermore, it releases proteolytic enzymes which cleave proteins and an immunomodulator.

The antagonism of this strain in respect of bacterial infections has been studied.

The antagonism of the strain *Bacillus subtilis* 534 to bacterial infectants was determined following the procedure suggested by V. I. Nikitenko. Into test-tubes with 5 cm³ of a sterile Kolbach's broth 40-50 mln. cells of a test-culture (control) are inoculated and, in the same doses, together the test-culture and the above-specified strain. The test-tubes are subjected to incubation in a thermostat for 24 hours at the temperature of 37° C. Since the bacteria of the strain *Bacillus subtilis* 534 only insignificantly changed the density of the broth, the degree of inhibition of growth of the test-culture was determined on a photoelectrocolorimeter by the difference between the test broth and control broth respectively. The result was regarded as positive if the mixture density was by 1.2 and over times lesser than the density of the test-culture.

The strain *Bacillus subtilis* 534 inhibited growth of 34 out of 37 studied strains of staphylococcus, 11 out of 12 strains of streptococci, 8 out of 12 strains of colibacillus, 7 out of 7 strains of salmonella, 6 out of 6 strains of proteus, 7 out of 8 strains of blue pus bacillus. Resistant and less-sensitive were mainly saprophilous strains of microorganisms.

To determine the presence of products of antibacterial substances into the ambient medium, cultures of the strain *Bacillus subtilis* 534 (three laboratory series) are grown for 96 hours in Erlenmeyer's flasks on a shaker (240 r.p.m.) at the temperature of 28° C. on a medium of the following composition, % by weight: peas flour—1.5, saccharose—2.1, starch—0.85, $NaNO_3$—0.5, $CaCO_3$—0.5, NaCl—0.5, water—the balance. The antibacterial activity of 0.1 cm³ of a filtrate of the cultural liquid is determined by the method of diffusion into a 2% meat-peptone agar. The size of zones of inhibition of the test-cultures was assessed with deduction of the recess diameter (8 mm).

The growth of staphylococcus was inhibited in zones of 24-27 mm, colibacillus—18-22 mm, clebsiella—18-21 mm, yeast fungus—22-24 mm.

In the determination of an acute toxicity three series of a preparation of a live culture of the strain *Bacillus subtilis* 534 are used. Each series is introduced intraperitoneally in a single dose to 3 white mice and 3 white rats of the Vistar line in the dose of 10 and 20 bln. cells per cm³ of a 0.9% solution of sodium chloride respectively. All the animals survived. They had a good appetite. The animals were slaughtered on the 3-rd, 7-th and 14-th day of the experiment. Histological investigations revealed no inflammatory or dystrophic changes in the brains, lungs, kidneys, liver, or heart. In the spleen there was noted an increase in the size of follicles and in the number of lymphohistocytic units in the red pulp.

For the study of the degree of an acute toxicity three series of a preparation from the strain *Bacillus subtilis* 534 are administered per os with meals to 6 white mice and 6 rats of Vistar line respectively once in the doses of 10 and 20 bln. cells respectively. All the animals survived. On the next day they were slaughtered. Histological investigations of the brains, myocardium, lungs, kidneys, stomach, large and small intestines have shown no changes as compared to the test group animals (10 mice and 10 rats). In the liver there was noted a certain increase in the number of lymphohistocytic infiltrates along the way of portal tracts. In the spleen an increase in the size of follicles was noticed along with the appearance of a great number of lymphohistocytic units in the red pulp and of giant pokynuclear cells.

In the determination of chronic toxicity three series of a preparation of the strain *Bacillus subtilis* 534 were introduced each for 30 days intraperitoneally to 3 white mice and 3 white rats of Vistar line respectively in the doses of 200 mln, and 1 bln, cells in 1 cm³ of a 0.9% solution of sodium chloride. Furthermore, each of the three series of the preparation was administered per os in the same doses to 6 white mice and 6 white rats of Vistar line. All the animals survived. The mass of the animals of the test groups as compared to the control ones (10 mice and 10 rats in each) was by 11-17% higher ($p<0.05$). The animals were slaughtered on the 31-st day. Histological studies of the brains, myocardium, lungs, kidneys, stomach, large and small intestines showed no changes. In the liver lymphohistocystic infiltrates located along the way of portal tracts were encountered in a greater number as compared to the animals of the control groups. In the spleen of the test groups of animals lymphoidization of the red pulp and increased size of follicles were noted, but no giant polynuclear cells were revealed.

During the experiments for testing a chronic toxicity on the 11-th-21-st day in 6 white mice 23 youngsters were born without malformations. Later on they gave birth to 7 youngsters without malformations.

For the determination of stability of the strain 9 capsules of a preparation of the strain *Bacillus subtilis* 534 were stored in tightly closed flasks at room temperature for 7 years. Additional 9 capsules were stored for 3 months at a temperature of −20° to −22° C., 9 capsules were stored at the temperature of 110° C. for 2 months. The number of live bacteria in the capsules was determined by the method of inoculation of samples from serial dilutions.

Prior to the beginning of experiments the content of bacteria in a capsule was equal to 5,4±0.5 bln. cells, upon storage for 7 years—5.2±0.5 bln. cells, upon storage at −20° to −22° C.—5.4±0.6 bln. cells, at 110° C.—5.3±0.6 bln. cells. Therefore, the data obtained show that the strain according to the present invention can be stored for 7 years within a wide temperature range.

The study of properties of the new strain *Bacillus subtilis* 534 has shown that it is non-toxic, does not possess teratogenic and allergenic effects.

The strain curdles milk and dairy products upon culturing due to evolution of proteolytic enzymes. Furthermore, it liberates an antibacterial substance of the protein nature which has a wide spectrum of action, and an immunomodulator.

The resulting lactic-acid product has a slight sweet taste without any odour. At a temperature of 2°-8° C. the product can be stored for 7 and more days without losing its organoleptic and therapeutic-preventive properties.

Experiments have been carried out to study the possibility of growth of a foreign microflora in the manufacture of the lactic-acid product. 3 dm³ of milk are pasteurized at the temperature of 90° C. for 30 minutes. The milk is poured into 6 glass bottles of 0.5 dm³ capacity each. Into each bottle 1 cm³ of a leaven containing 1 bln of cells of a live culture of the strain *Bacillus subtilis* 534 is introduced. The bottles are closed with cotton-wool-cloth plugs and placed into a thermostat at the temperature of 37° C. Two hours thereafter into 2 samples 1 bln. cells of a live culture of the strain *Staphylococcus aureus* are introduced and into 2 samples 1 bln of cells of a live culture of the strain *Shigella flexneri* are introduced into each. The formation of a uniform curd took place in the experiments within 14–16 hours, in the control—within 10–12 hours. In the experiments and in the control only one strain was inoculated from the dairy product, viz. *Bacillus subtilis* 534.

For a better understanding of the present invention, some specific examples illustrating the preparation of a lactic-acid product and use thereof are given hereinbelow.

EXAMPLE 1

50 dm$^3$ of milk are pasteurized at the temperature of 75° C. for 30 minutes. Right after completion of pasteurization the milk is poured into 0.5 dm$^3$ glass bottles into which 1 cm$^3$ of a leaven containing 10 bln. of cells of a live culture of the strain *Bacillus subtilis* 534 are introduced. The bottles are closed with foil caps and placed into a thermostat at the temperature of 30° C. The formation of a uniform dense curd occurs within 6 hours. A product is thus obtained which has a slightly sweet taste, a uniform consistence and no odour; phosphatase is absent. Acidity is 20° T. There is no contamination with a foreign microflora.

The resulting dairy product is stored at the temperature of 8° C. for 7 days without losing its organoleptic properties. The acidity has increased insignificantly to 28° T. No contamination with a foreign microflora is observed. At the same time, under the same conditions there have been stored 6 samples of kefir produced with the use of lactic-acid bacteria; the product became putrified within 48 hours.

EXAMPLE 2

2 dm$^3$ of buttermilk are pasteurized for 15 minutes at the temperature of 100° C. Immediately thereafter 4 cm$^3$ of a leaven containing 500 cells each of a live culture of the strain *Bacillus subtilis* 534 is 1 cm$^3$ are introduced . The buttermilk with the leaven is placed into a thermostat with the temperature of 38° C. A complete fermentation occurs after 24 hours. A product is thus obtained which has a slightly sweet taste, without odour, acidity −49° T. No contamination with a foreign microflora is noticed.

EXAMPLE 3

The lactic-acid product prepared as described in the foregoing Example 1 is subjected to testing. Female patient S., 11 months; Diagnosis: diabetes, disbacteriosis. Antibiotics were administered against pneumonia. Since 6 months meteorism was noted along with eruptions on the skin of the face and body. Disbacteriosis was found in analysis of the stool. The lactic-acid product prepared as in Example 1 was administered on an empty stomach 2 times a day in the dose of 10 cm$^3$. The eruptions on the face and skin disappeared on the 7–8-th day. The stool analysis on the 15-th day showed normalization of the microflora composition.

EXAMPLE 4

Used for therapy is the lactic-acid product prepared as in Example 2 hereinabove. Patient P., 24 years. Diagnosis: a purulent wound of the right crus, peptic ulcer of the stomach. The product is administered per os twice a day by portions of 200 cm$^3$. After 2 days the strain *Bacillus subtilis* 534 was found in the wound exudate together with *Staphylococcus aureus*. The wound has become clean and epithelized on the 11-th day. The patient noted a lesser intensity of attacks of hunger pains.

EXAMPLE 5

A lactic-acid product prepared in a manner similar to that described in Example 1 hereinbefore was administered for prophylaxis of disbacteriosis in 4 patients in a dose of 10 to 250 cm$^3$ 1–2 times a day; the patients were administered previously with antibiotics for a long time. Bacterial investigations of the stools made on the 12-th day have shown that in all of the patients the composition of the microflora does not differ from the normal one. Clinical symptoms of bacteriosis were also absent. At the same time, out of 7 patients of the control group in 5 disbacteriosis of various severity was observed.

The dairy products in the same doses were administered for therapy of disbacteriosis in 2 patients, diathesis—in 3, purulent wounds—in 3 patients (one patient also had peptic ulcer of the stomach). Clinical arresting of the pathological processes on the 2-nd-9-th day of the treatment was noticed in all of 8 patients. Bacteriological investigation of the stool on the 12-th day have shown normalization of the microflora composition.

Upon administration of the above-mentioned lactic-acid product to 10 healthy volunteers in the dose of 250 cm$^3$ twice a day during one month no pathological reactions were observed.

INDUSTRIAL APPLICABILITY

The process according to the present invention is useful for the manufacture of food lactic-acid products exhibiting therapeutic and preventive properties and intended for prophylaxis and treatment of bacterial infections, disbacteriosis, diathesis and food allergy.

I claim:

1. A process for preparing lactic-acid products by fermentation of milk or products thereof with live bacteria to give the desired product, which comprises pasteurizing said milk or products thereof; adding to said milk or products thereof, a culture of strain *Bacillus subtilis* 534; and subjecting said milk or products thereof to fermentation conditions.

2. A process for preparing lactic-acid products by fermentation of milk or products thereof with live bacteria to give the desired product, which comprises pasteurizing said milk or products thereof for from 15 to 30 minutes at a temperature of between 75° and 100° C.; adding to said milk or products thereof an amount of from 10$^3$ to 10$^{11}$ of live cells and spores per dm$^3$ of a culture of strain *Bacillus subtilis* 534; and fermenting said milk or products thereof at a temperature of from 30° to 38° C. for from 6 to 24 hours.

* * * * *